United States Patent [19]

Spitz et al.

[11] Patent Number: 5,055,535

[45] Date of Patent: Oct. 8, 1991

[54] PROCEDURE FOR GAS-PHASE POLYMERICATION OF ETHYLENE ALLOWING THE FABRICATION OF LINEAR POLYETHYLENE WITH A NARROW MOLECULAR-WEIGHT DISTRIBUTION

[75] Inventors: Roger Spitz, St. Symphorien D'Ozon; Claude Brun, Idron; Jean-Francois Joly, Chatillon Sous Bagneux, all of France

[73] Assignee: Atochem, Pateaux, France

[21] Appl. No.: 447,670

[22] Filed: Dec. 8, 1989

[30] Foreign Application Priority Data

Dec. 14, 1988 [FR] France .................................. 88 16470

[51] Int. Cl.$^5$ .......................... C08F 2/34; C08F 4/32
[52] U.S. Cl. .................................. 526/142; 526/209; 526/348.6; 526/352; 526/901; 526/904
[58] Field of Search ...................... 526/142, 209, 901

[56] References Cited

U.S. PATENT DOCUMENTS

| | | | |
|---|---|---|---|
| 4,256,866 | 3/1981 | Karayannis et al. | 526/142 |
| 4,684,703 | 8/1987 | Wagner et al. | 526/901 X |
| 4,701,505 | 10/1987 | Fujii et al. | 526/142 X |

FOREIGN PATENT DOCUMENTS 6667386  6/1987  Australia ............................ 526/901

*Primary Examiner*—Fred Teskin

[57] ABSTRACT

A process for the manufacture of a linear polyethylene with narrow molecular-weight distribution comprising polymerizing ethylene alone or a mixture of ethylene and an alpha-olefin in which ethylene represents at least about 70% by weight of the total monomers involved, in a gas-phase polymerization medium in the presence of a catalytic component containing at least one transition metal, magnesium, and a halogen, a co-catalyst comprising an alkylaluminum compound, and a monoether, the monoether having the general formula R'OR", wherein R' and R" are the same or different and each is a $C_1$ to $C_8$ linear or branched hydrocarbon radical or being a cyclic monoether with the oxygen forming a ring having 4 to 12 carbon atoms.

4 Claims, No Drawings

PROCEDURE FOR GAS-PHASE POLYMERIZATION OF ETHYLENE ALLOWING THE FABRICATION OF LINEAR POLYETHYLENE WITH A NARROW MOLECULAR-WEIGHT DISTRIBUTION

BACKGROUND OF THE INVENTION

The present invention pertains to a polymerization procedure for producing a linear polyethylene from ethylene with a narrow molecular-weight distribution. It is understood that the term "polymerization" includes the copolymerization of ethylene with an alpha-olefin, ethylene remaining the major element for fabricating a linear polyethylene. In the conventional fabrication of linear polyethylenes, ethylene represents a minimum of 70% by weight of the total monomers involved.

The procedure in accordance with the invention is comprised of gas-phase polymerization of ethylene in the presence of a catalytic component containing at least one transition metal, magnesium and a halogen, and a co-catalyst composed of an alkylaluminum and an electron donor; the electron donor is characterized by being selected from among the monoethers.

In the polymerization of propylene, it is known to necessarily combine an electron donor with the titanium halide type co-catalyst component on a support comprising magnesium. This combination is indispensable for obtaining isotacticity and stereoregularity in the polymerization of propylene. In this case the presence of the electron donor facilitates obtainment of good orientation of the $CH_3$ branchings of the chain.

Although the presence of the electron donor allows an improvement in the stereoregularity, it is known to be a catalyst poison in that it generally harms the productivity of the said catalyst by decreasing it very greatly. Therefore, in the case of the polymerization of propylene, it is necessary to find a compromise in the addition of electron donor: sufficient for obtaining good stereoregularity but not too much for obtaining a reasonable productivity of the catalyst. Among other places, this can be found in U.S. Pat. No. 4,511,703, one of the numerous patents relative to Ziegler catalysts of propylene polymerization in which an electron donor is taken into account. Among these patents, U.S. Pat. Nos. 4,535,069, 4,304,891, 4,387,328, 4,363,901 and 4,473,660 can be cited in which the sole focus is on the polymerization or copolymerization of propylene and the stereoregularity of the polymer.

This question of stereoregularity is not raised in the case of the polymerization of ethylene or mixtures in which it is found in excess. Therefore, the employment of an electron donor, which can only act negatively by reducing the productivity or the activity of the catalyst or, in addition, by introducing problems of odor, is only done very selectively with precise goals in combination with the co-catalyst of ethylene polymerization. Conventionally, as for example in U.S. Pat. No. 4,497,904, ethylene is polymerized in the presence of a titanium-based catalytic component and an alkylaluminum as co-catalyst, with the co-catalyst not containing an electron donor.

In European Patent application 232,643, the employment of an electron donor combined with the co-catalyst makes it possible to preserve the spherical structure of a spherical catalytic component entering in the composition of a stable, spherical catalyst of ethylene polymerization. In this application, most of the known electron donors are suitable for obtaining the desired result.

For the purpose of fabricating polyethylenes with a high apparent density with good catalytic productivity, it is recommended in French Application 2,531,717 that the co-catalyst and the titanium-based catalytic component be combined with an electron donor from the silane family. These products have the drawback of undergoing degradation reactions in the presence of alkylaluminum, as reported by E. Vahasarja et al., *Journal of Polymer Science* 25, 3241 (1987).

For the same purpose, it is proposed in European Patent application 155,682 to combine with the catalytic systems for ethylene polymerization an electron donor containing at least one nitrogen atom in its molecule. However, this type of electron donor has the drawback of creating odor problems and/or residual toxicity in the polymer.

SUMMARY OF THE INVENTION

In accordance with the present invention, there has been demonstrated a family of electron donors which, combined with the Ziegler catalytic system, based on at least one transition metal and magnesium, for gas-phase polymerization of ethylene, makes it possible, while noticeably preserving the productivity of the catalyst, to fabricate a linear polyethylene, which can even be used in alimentary applications, which has narrow molecular-weight distribution. The electron donor is selected from the monoether family. These monoethers can be illustrated by the formula $R'OR''$, in which $R'$ and $R''$ are identical or different, linear or branched hydrocarbon radicals, preferably saturated, containing 1–8 carbon atoms. They can also be cyclical, with the oxygen forming a ring carrying at least 4 but no more than 12 carbon atoms. It is not excluded that certain of the carbon atoms of the ring are linked to be substituent hydrocarbon radicals and in this case, the total number of carbon atoms in the cyclical ether shall not exceed 16. In the family of monoethers which are the object of the invention, diethyl ether, n-dibutylether, s-dibutylether, dioctylethers, tetrahydrofuran, tetrahydropyran, 2-methyltetrahydrofuran and 3-methyltetrahydropyran can be cited.

DETAILED DESCRIPTION

It is unexpected to find that in the ether family of electron donors, only the monoethers make it possible in the case of gas-phase polymerization of ethylene to fabricate a linear polyethylene with narrow molecular-weight distribution, while noticeably maintaining the productivity of the catalyst.

"Linear polyethylene" as used herein means not only high-density polyethylene obtained by homopolymerization of ethylene, but also the copolymers with a density greater than 880 g/L of ethylene and at least one alpha-olefin such as propylene, 1-butene, 1-hexene and 4-methyl-1-pentene. The polymers with narrow molecular weight distribution have on average a polydispersity between about 3 and 7, the polydispersity being the ratio of the molecular weight by weight to the molecular weight by number. These polymers with strong fluidity have a fluidity index ratio $MFR_{5-2}$ less than 3.3, $MFR_{5-2}$ being the ratio $MI_{5/2}$ of the fluidity index under 5 kg to the fluidity index under 2.16 kg according to ASTM Standard D 1238, the ratio $MFR_{21-5}$ of the fluidity index under 21.6 kg to the fluidity index under 5 kg, $MI_{21}/_MI_5$ is less than 10, the ratio $MI_{21}/MI_2$ of the fluidity indexes under 21.6 kg and 2.16 kg according to ASTM Standard D 1238 being less than 32.

Gas-phase polymerization of ethylene, in the presence of hydrogen and possibly inert gas, can be carried out in any reactor allowing gas-phase polymerization, particularly in an agitated-bed or fluidized-bed reactor. The conditions for implementation are conventional and are known from the prior art. Operations are generally carried out at a temperature below the fusion point (Tf) of the polymer or copolymer to be synthesized, most particularly between 20° and (Tf-5° C.) and under a pressure such that the ethylene and the other hydrocarbon monomers present in the reactor are essentially in vapor phase.

In this procedure, the olefin is initially placed directly in contact in the reactor with the catalytic system comprised of the catalytic component, the co-catalyst and the monoether as defined above.

The Ziegler-type catalytic component is known in itself. It is conventionally the result of the combination of at least one transition metal compound, a magnesium compound, a halogen, possibly an electron donor or acceptor and of all other compounds employable in this type of catalyst. The transition metal compound is generally selected from among the compounds of formula $Me(OR)_nX_{m-n}$, in which Me is vanadium, chromium and more particularly titanium, X is bromine, iodine and more particularly chlorine, R is an aliphatic or aromatic hydrocarbon radical of $C_1$ to $C_{14}$ or $COR_1$ with $R_1$ being an aliphatic or aromatic hydrocarbon radical of $C_1$ to $C_{14}$, "m" corresponds to valence of the transition metal, and "n" is a value less than or equal to "m".

The particularly recommended transition metal compound is selected from among titanium compounds of the formula $Ti(OR)_xCl_{4-x}$, R being defined above, x being a number between 0 and 4.

The magnesium compound is conventionally selected from among the compounds of formula $Mg(OR)_nX_{2-n}$, in which X is bromine, iodine and more particularly chlorine, R is hydrogen or an alkyl or cycloalkyl radical and "n" is less than or equal to 2.

The electron donor or acceptor is a liquid or solid organic compound known to enter into the composition of these catalysts. The electron donor can be a mono or polyfunctional compound advantageously selected from among the aliphatic or aromatic carboxylic acids and their alkyl esters, the aliphatic or cyclic ethers the ketones, the vinyl esters, the acrylic derivatives, particularly alkyl acrylates of methacrylates, and the silanes. Especially suitable as electron donors are compounds such as methyl paratoluate, ethyl benzoate, ethyl or butyl acetate, ethyl ether, ethyl paraanisate, dibutylphthalate, dioctylphthalate, diisobutylphthalate, tetrahydrofuran, dioxane, acetone, methylisobutylacetone, vinyl acetate, methyl methacrylate, and silanes such as phenyltriethyoxy/silane and cyclohexylmethyldimethoxysilane, the aromatic or aliphatic alkoxysilanes.

The electron acceptor is a Lewis acid, selected preferably from among aluminum chloride, boron trifluoride, chloranil or the alkoylaluminums and alkoylmagnesiums.

As stated above, the co-catalyst is selected from among the alkylaluminums. From among these products, one can cite the compounds of formula $Al(R_2)_cX'_dH_e$ in which X' is Cl, $R_2$ represents a $C_1$ to $C_{14}$ saturated hydrocarbon radical or $(OR_3)$, and $R_3$ being a $C_1$ to $C_{14}$ saturated hydrocarbon radical, with: $0 \leq d \leq 1.5$; $0 \leq e \leq 1$ and $c+d+e=3$.

The following can be cited as examples: $Al(C_2H_5)_3$, $Al(C_2H_5)_2Cl$, $Al(C_4H_9)_3$, $Al_2(C_2H_5)_3Cl_3$, $Al(C_4H_9)_2H$, $Al(C_6H_{13})_3$, $Al(C_8H_{17})_3$, $Al(C_2H_5)_2H$ and $Al(C_2H_5)_2(OC_2H_5)$. The aluminoxanes and the aluminosiloxanes can also be cited.

The monoether, whose use is the object of the invention, is added to the catalytic component and the co-catalyst, at the latest, upon commencement of the polymerization reaction. Under no circumstance should the monoether be brought into contact with the catalytic component without the presence of the co-catalyst in the medium. Preferably, with the knowledge that the monoether does not react with the alkylaluminum by exchange of reactive groups but rather forms an association complex with the alkylaluminum, it is recommended that prior to bringing the co-catalyst into contact with the catalytic component, a complex should be formed by mixing the co-catalyst and the monoether.

The gas-phase polymerization can be carried out into two steps. In the first step, it is possible to consolidate the catalytic system by carrying out an ethylene-based prepolymerization in the presence of the constituents of the catalytic system and, containing in the second step, the gas-phase polymerization is effected by adding ethylene or a mixture of ethylene and alpha olefin stated above. In this case, the monoether is, as above, preferably added as a complex with the co-catalyst and, at the latest, at the end of the prepolymerization step, this step representing a formation of polymer not exceeding 10% by weight of the total polymer which should be formed. This prepolymerization step is preferably carried out in gas phase, but can also be carried out in suspension in the presence of a hydrocarbon diluent or in a combination of gas phase and suspension, it being understood that the final polymerizations step is carried out in gas phase.

The amount of monoether employed is defined by the ratio between the number of moles of monoether and the number of moles of co-catalyst counted as atoms/-gram of aluminum. The ether/Al ratio is generally between 1 and 1/100 and, preferably, between 1/10 and 1/60.

The invention will be further described in connection with the following examples which are set forth for purposes of illustration only.

EXAMPLE 1

A. Synthesis of the Catalytic Component

Ten grams of anhydrous $MgCl_2$ are ground for six hours under an inert atmosphere; 1.8 mL of dibutylphthalate is then added and they are ground together for two hours; 0.7 mL of $TiCl_4$ is then added and they are ground together for four hours.

The solid is extracted from the grinding down with dry heptane and then decanted and dried under a vacuum of ca. one Pa at room temperature. The solid obtained is treated with 50 mL of $TiCl_4$ at 80° C. for two hours.

The solid is decanted and thoroughly washed with dry heptane and after drying under vacuum at room temperature, catalytic component A is obtained which contains 4.4% by weight of titanium.

B. Vapor-Phase Polymerization

The ethylene and butene are copolymerized in gas phase in a 2.5-L stainless steel reactor equipped with a blade agitator.

One mM of trihexylaluminum complexed with 1/20 mM of the selected monofunctional ether are introduced under an argon stream into the dry reactor containing an initial charge of 15 g of polyethylene obtained from a prior test carried out under the same conditions, at a stirring rate of 250 rpm and a temperature of 80° C. The reactor is placed briefly under vacuum and 1.7 bar or butene, 8.3 bars of ethylene and 2 bars of hydrogen are added. The temperature is brought to 85° C. The catalytic component A, in an amount corresponding to 0.66 mg of titanium, is introduced into the reactor. The total pressure of 12 bars is maintained constant by continuous addition of an ethylene-butene mixture having the composition indicated for each of the tests. The duration of the polymerization is one hour. The reactor is then cooled to 25° C. and degassed. A regular polymer powder is extracted; the reactor walls are not sticky.

To provide a comparison, the test is repeated using catalytic component A but without ether.

reactor is then cooled to 25° C. and degassed. A regular polymer is extracted. The table below presents the productivity characteristics of the tests carried out with different ethers.

Test 1, without ether, is given for comparative purposes.

Test 2, carried out with a difunctional ether, is given for comparative purposes.

Test 3, carried out with a trifunctional ether, is given for comparative purposes.

The polymers are characterized by the degree measured at 190° C. at 2.16 kg and the ratio between the degrees measured at 5 and at 2.16 kg.

| TEST | ETHER | PRODUCTIVITY grams of polymer per gram of catalyst | $MI_{2.16}$ | $MI_5/MI_{2.16}$ |
|---|---|---|---|---|
| | n-butylether | 3,900 | 2.2 | 2.6 |
| | sec-dibutylether | 3,600 | 2.1 | 2.6 |
| | dioctylether | 3,800 | 2.5 | 2.7 |
| | tetrahydrofuran | 4,000 | 2.2 | 2.55 |
| | 1 none | 3,300 | 2.7 | 3 |
| COMPAR-ATIVE | 2 2,2-dimethoxy-propane | 3,400 | 2.5 | 2.8 |
| | 3 diglyme | 2,100 | 2.6 | 2.8 |

| TEST | ETHER | $C_2H_5$/1,000 C Number of $C_2H_5$ branchings per 1,000 carbons | PRODUCTIVITY grams of polymer of gram of catalytic component | $MI_2$ | $MI_{21}/MI_2$ |
|---|---|---|---|---|---|
| 1 | THF(a) | 23.4 | 4,700 | 0.7 | 22 |
| 2 | $C_4H_9OC_4H_9$ (b) | 18.9 | 4,600 | 1.5 | 24 |
| 3 comparative | — | 22.8 | 5,850 | 1.6 | 29 |

(a) tetrahydrofuran
(b) n-dibutylether

EXAMPLE 2

The ethylene is polymerized in the same reactor as employed for Example 1. One mM of trihexylaluminum complexed with 1/20 mM of the selected monofunctional ether are introduced under an argon stream into the dry reactor coating a charge of 15 g of polyethylene obtained from a prior test carried out under the same conditions, at a stirring rate of 250 rpm and a temperature of 85° C. The reactor is placed briefly under vacuum and 10 bars of ethylene and then 5 bars of hydrogen are added. The temperature is brought to 95° C. The catalytic component A, in an amount corresponding to 1.1 mg of titanium, is added. The total pressure is maintained constant by continuous addition of ethylene. The duration of the polymerization is one hour. The

EXAMPLE 3

A. Synthesis of the Catalytic Component

The following are introduced into a stirred reactor which was dried and purged with nitrogen in advance:

(i) 400 mL of butyloctylmagnesium (BOMAG)/tetraisobutylaluminoxane (TIBOA) mixture at 44% in heptane, i.e., 0.72 mole of BOMAG
0.23 mole of TIBAO, and (ii) 0.06 mole of diisoamylic ether.

The temperature is raised to 50° C. and the stirring set to 750 rpm. The following mixture is then injected over two hours;

(i) 1.8 mole of tertiobutyl chloride (TBuCl), and
(ii) 0.54 mole of diisoamylic ether.

When the addition is completed, the reaction is allowed to continue for 1.5 hours at 50° C. The precipitate formed is then decanted and filtered. Three washings are carried out with 400 cc of hexane. After elimination of the hexane, a precipitate is obtained with spherical morphology.

Ten g of precipitate are placed in suspension in 70 cc of dry hexane.

Bubbling is carried out with gaseous HCl (0.5 mole) for 30 minutes at 20° C., followed by filtration. The precipitate is washed and dried twice with 70 cc of hexane. The precipitate is placed in suspension in 50 mL of pure $TiCl_4$ and then stirred for three hours at 90° C. The excess $TiCl_4$ is eliminated by filtration. The solid is then washed with hexane until the absence of $TiCl_4$ in the filtrate. It is then dried by passing through nitrogen. A catalytic component of spherical form is obtained with the following composition:

| Ti | 1.6% | Cl | 67.4% |
|----|------|----|----|
| Mg | 21.8% | Al | 250 ppm |

B. Synthesis of the Prepolymers

Test 1: Into a 1.5-L stirred reactor, which was dried in advance and is maintained at 40° C., the following are introduced successively:
(i) 0.8 L hexane,
(ii) 13.6 mM of pure trihexylaluminum (THA),
(iii) 1 g of the previously described catalytic component, and
(iv) 3 bars of hydrogen.

Over a 4 hour 40 minute period 88 Nl of ethylene are introduced while progressively increasing the ethylene flow rate from the initial value of 1.2 Nl/hour to the value of 48 Nl/hour.

After introduction of the ethylene has been completed, the solvent is eliminated by passing under nitrogen at 60° C.

111 g of catalytic component is collected in the form of dry prepolymer of spherical form.

Test 2: The same conditions are employed as in Text 1, except that the THA is replaced by a THA/dibuthylether (DBE) complex in a molar ratio of 20.

112.6 g of catalytic component is collected in the form of dry prepolymer of spherical form.

C. Synthesis of Homopolymers (PEHD)

Operations are carried out in an 8.2-liter reactor, which has been dried in advance, in the presence of 10 g of polyethylene powder as dispersant charge. Into this reactor maintained at 90° C. during the entire polymerization, hydrogen is injected, while stirring at 400 rpm under a 1.33 Pa vacuum, until a pressure of 1 bar absolute is obtained. The hydrogen injection is completed until the pressure is raised to 5 bars absolute. Eight bars of ethylene are then injected into the reactor until hydrogen and ethylene partial pressures of 6 bars and 8 bars, respectively, are obtained. After these injections, one introduces 5 g of active prepolymer containing the catalytic component, by nitrogen thrust. The injection of nitrogen is continued until the total pressure inside the reactor reaches 21 bars. The pressure is maintained at this value inside the reactor by injection of ethylene. After two hours of reaction, the polymerization is stopped by decompression of the reactor. The nitrogen is purged and cooling is allowed to occur.

The results obtained are given in the following tables:

| TEST | ETHER | $MI_2$ | $MI_5/MI_2$ | POLYMOLECULARITY |
|------|-------|--------|-------------|------------------|
| 1 | none | 12.8 | 3.4 | 11.1 |
| 2 | DBE | 5.95 | 3.05 | 7 |

| TEST | WEIGHT OF PREPOLYMER | PRODUCTIVITY IN GRAMS PE/GRAMS OF CATALYST | APPARENT DENSITY (MVA) | dp50 |
|------|---------------------|--------------------------------------------|-----------------------|------|
| 1 | 5 g | 6,504 | 0.494 | 415μ |
| 2 | 5 g | 6,306 | 0.501 | 345μ |

D. Synthesis of Copolymers (LLDPE)

Operations are carried out in an 8.2-liter reactor, which has been dried in advance, in the presence of 10 g of polyethylene powder as dispersant charge. Into this reactor maintained at 85° C. during the entire polymerization, 1-butene is injected, while stirring at 400 rpm under a 1.33 Pa vacuum, until a pressure of 1 bar absolute is obtained. The 1-butene injection is completed until the pressure is raised to 2 bars absolute. Two bars of hydrogen and nine bars of ethylene are then injected into the reactor until hydrogen and ethylene partial pressures of 2 bars and 9 bars, respectively, are obtained. After these injections, one introduces 5 g of active prepolymer containing the catalytic component, by nitrogen thrust. The injection of nitrogen is continued until the total pressure inside the reactor reaches 21 bars. The pressure is maintained at this value inside the reactor by injection of a 1-butene/ethylene mixture in a molar ratio of 0.0466. After two hours of reaction, the polymerization is stopped by decompression of the reactor. The nitrogen is purged and cooling is allowed to occur.

The results obtained are given in the following tables:

| TEST | ETHER | $C_2H_5/1000\ C$ | $MI_2$ | $MI_{21}/MI_2$ |
|------|-------|------------------|--------|----------------|
| 1 | none | 18.9 | 2.5 | 33.1 |
| 2 | DBE | 18.5 | 1.27 | 31 |

| TEST | WEIGHT OF PREPOLYMER | PRODUCTIVITY IN GRAMS PE/ GRAMS OF CATALYST | APPARENT DENSITY | dp50 |
|------|---------------------|---------------------------------------------|------------------|------|
| 1 | 5 | 10,500 | 0.473 | 503μ |
| 2 | 5 | 12,700 | 0.475 | 656μ |

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A process for the manufacture of a linear polyethylene with narrow molecular-weight distribution comprising polymerizing ethylene alone or a mixture of ethylene and an alpha-olefin in which ethylene represents at least about 70% by weight of the total monomers involved, in a gas-phase polymerization medium in the presence of a catalytic component containing at least one transition metal, magnesium, and a halogen, a co-catalyst comprising an alkylaluminum compound, and a monoether, the monoether being brought into contact with the catalytic component only in the presence of the alkylaluminum compound in the medium and having the general formula R'OR", wherein R' and R" are the same or different and each if a $C_1$ to $C_8$ linear or branched hydrocarbon radical or being a cyclic monoether with the oxygen forming a ring having 4 to 12 carbon atoms.

2. The process of claim 1 wherein the monoether is a cyclic monoether in which some of the carbon atoms of the ring are substituted with hydrocarbon radicals, the total number of carbon atoms of said cyclic ether not exceeding 16.

3. The process of claims 1 or 2 wherein the monoether is first admixed with the alkylaluminum co-catalyst to form a complex, which complex is then added to the polymerization medium.

4. The process of claim 1 or 2 wherein the monoether is brought into contact with the catalytic component only in the presence of the alkylaluminum compound in the medium and said monoether is diethyl ether, n-dibutylether, s-dibutylether, a dioctylether, tetrahydrofuran, tetrahydropyran, 2-methyltetrahydrofuran, or 3-methyltetrahydropyran.

* * * * *